Nov. 22, 1949  R. J. HERBOLD  2,489,222
ELECTRIC MEANS FOR INDICATING THE ALTITUDE AND
POSITION OF A CRAFT WHEN LANDING ON A RUNWAY
Filed June 7, 1946  2 Sheets-Sheet 1
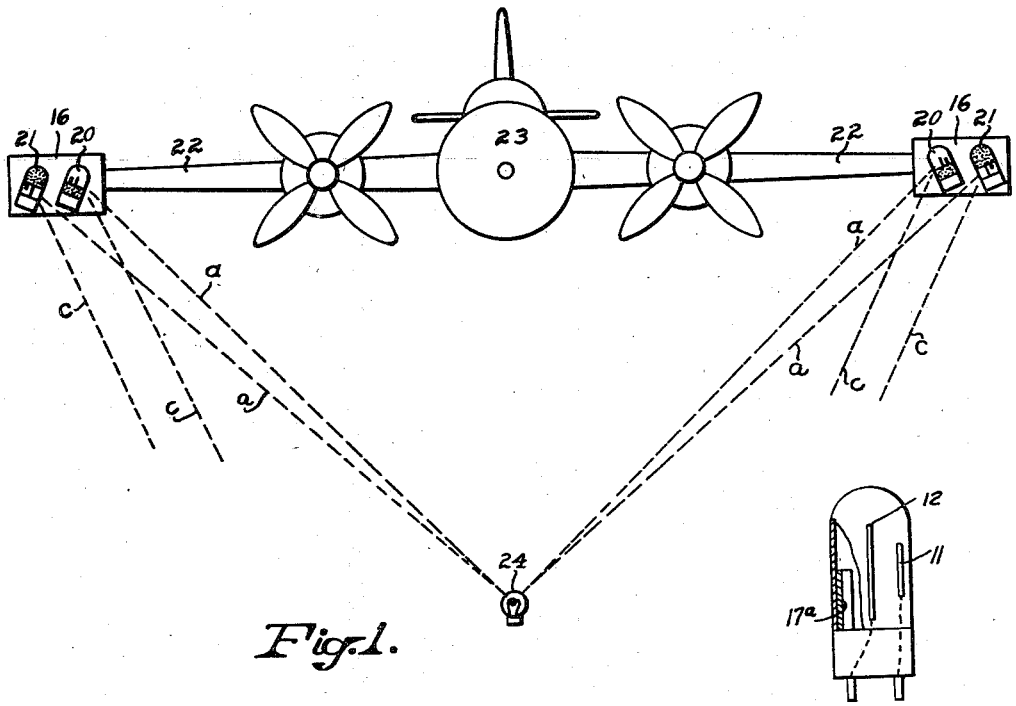
*Fig. 1.*
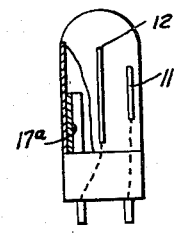
*Fig. 9.*
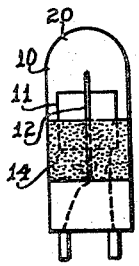
*Fig. 2.*
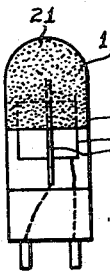
*Fig. 3.*
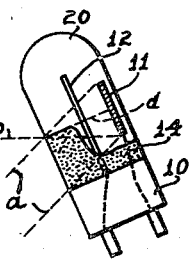
*Fig. 4.*
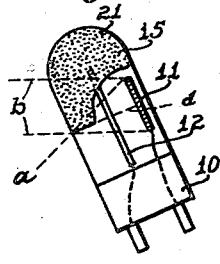
*Fig. 5.*
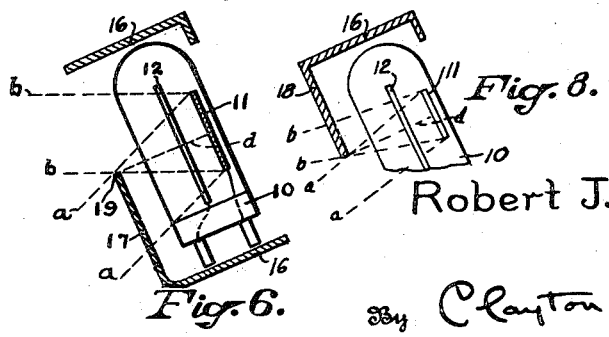
*Fig. 6.*  *Fig. 8.*
Inventor
Robert J. Herbold
By Clayton L. Jenks
Attorney
Witness
Herbert E. Covey Patented Nov. 22, 1949

2,489,222

UNITED STATES PATENT OFFICE 2,489,222

ELECTRIC MEANS FOR INDICATING THE ALTITUDE AND POSITION OF A CRAFT WHEN LANDING ON A RUNWAY

Robert J. Herbold, Denver, Colo., assignor to Lafayette M. Hughes, Denver, Colo.

Application June 7, 1946, Serial No. 675,042

11 Claims. (Cl. 33—46)

This invention relates to apparatus for aiding the landing of aircraft, and more particularly to apparatus which determines the altitude and position of aircraft in flight relative to an airport runway.

It has been proposed to triangulate the position of aircraft in flight relative to a single spotlight at the far end of the runway by means of two photo eyes on the opposite wing tips. This use of a single beacon light requires for triangulation purposes that the line of light from the beacon to the photo eye on one wing tip make a right angle with a line connecting the two photo eyes; but it would be difficult, even under quite atmospheric conditions, to maintain that angular relationship for the purpose of triangulating the altitude. Other proposals have involved projecting a light ray from the aircraft to the ground and measuring the angle of incidence of the reflected beam in order to determine altitude; but this method is not satisfactory under heavy fog and storm conditions because of the reflection of light from the particles in the atmosphere.

In accordance with the disclosures of my prior applications, Serial #562,353, filed November 7, 1944, and Serial #582,918, filed March 15, 1945, I have provided photoelectric apparatus for determining the altitude and alignment of aircraft relative to the runway which triangulates the altitude of the aircraft relative to a line of lights spaced widely from and parallel with the runway center line and which further determines the position of the craft relative to a second line of lights aligned with the runway.

One object of the present invention is to provide apparatus in which but a single line of lights at the airport runway is required, and both the altitude and alignment of the craft may be determined thereby.

A further object of the invention is to provide photo electrical apparatus on the craft and an associated line of lights at the runway which will both determine whether the aircraft is in alignment with the runway center line for a proper landing and show the altitude when that alignment has been attained, and which merely requires that the pilot alter his course in accordance with the photoelectric observations until alignment is automatically indicated and thereafter the altitude of the craft relative to the runway is correctly shown.

A still further object is to provide a simplified form of apparatus which will permit the landing of aircraft on a runway under zero ceiling and night conditions and wherein the instruments make such observations of the position and altitude of the craft that a blind landing may be effected with safety.

Another object is to provide electronic apparatus including a photocell and light shield of special construction which will provide for a measurement or indication of distance, position or other dimensions or for the control of indicators or other apparatus in accordance with optically observed conditions which depend upon the directive angularity of a light beam. Further objects will be apparent in the following disclosure.

In accordance with this invention, I provide photoelectric cells near each wing tip which are arranged to observe optically a single line of light extending along the runway and preferably aligned with its center line for the effective distance of landing approach; and these elements are arranged in electronic circuits governing an indicating instrument which is so calibrated as to give an indication of position relative to the light, and when the craft is vertically aligned over the light line, the indication is one of altitude measurement.

Referring to the drawings which illustrate a preferred embodiment of the invention;

Fig. 1 is a diagrammatic showing of an aircraft with two sets of electronic elements so positioned on the wing tips as to observe optically a line of light arranged along the runway center line;

Figs. 2 and 3 are front views of two types of shielded photo cells which will serve for observing the line of light;

Figs. 4 and 5 are side views respectively of the two cells of Figs. 2 and 3;

Fig. 6 is a view of a modified cell and shield construction;

Fig. 8 is a fragmentary view corresponding with Fig. 6 showing an upper external shield; and Fig. 9 is a modified form of tube having a shield arranged on the inside.

Figure 7:
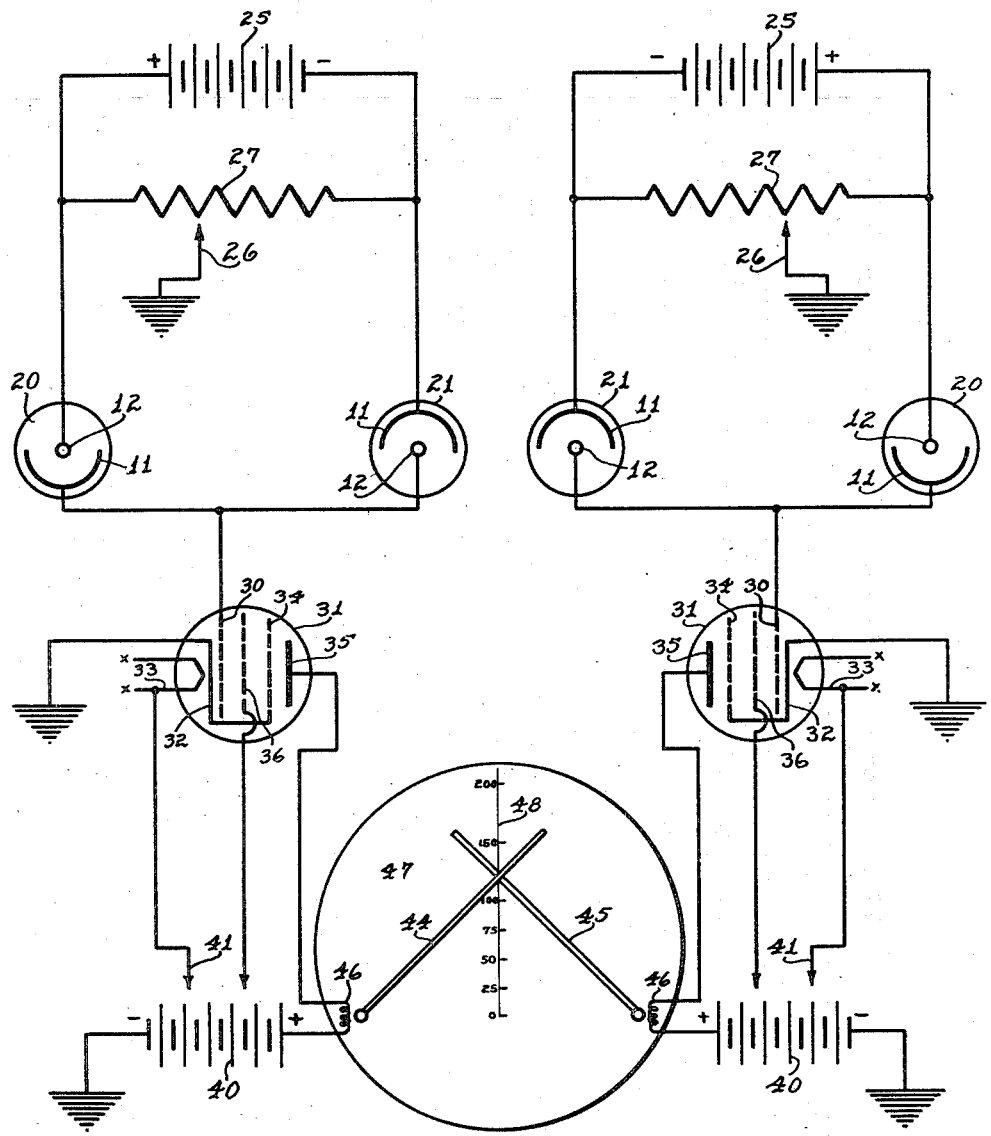
Fig. 7 is a diagrammatic showing of the electronic circuits of the two sets of photo tubes.

The emission of electrons from the light sensitive element of a photo cell is proportional, other conditions being equal, to the area of the sensitized surface which is illuminated and activated by light rays such as are derived from the runway lights. A photocell of the type herein described is so arranged relative to a light shield or filter that the area of the illuminated portion of the sensitive element varies with the directive angularity of a light beam received from the line of light. The electron emissive phototube illustrated in Figs. 2 to 5 inclusive may be a standard type having a transparent shell 10 and a cathode 11 and an anode 12 suitably mounted therein and wherein the cathode presents a sensitive surface that is capable of activation by light and particularly the infrared rays. The cathode may be a plate of rectangular or other suitable shape arranged parallel with the center line of the tube. Each cathode is to be activated throughout its entire area when the light impinging thereon comes from a given direction. To cause a variation in area of activation, the lower portion of the outer transparent shell 10 of the construction of Fig. 2 is covered with an opaque light shield 14, or with a filtering medium, such as a Wratten gelatin filter #64, which will not transmit a material amount of red and infrared light waves. Similarly, the upper portion 15 of the shell 10 of Fig. 3 is covered with a shield of opaque or infrared filtering material. The cathodes are of such height and location, and the shields 14 and 15 are so shaped and located on opposite sides of a medial portion of the cathode that as the light moves angularly relative to each of the phototubes, the shields will ultimately cast a shadow on a varying area of the cathode. The shields preferably extend to a plane (see dotted line $d$ in Figs. 4 and 5) that is perpendicular to a horizontal center line in each cathode, so that, if the tubes are tilted at an angle of 22½° (Figs. 4 and 5), a ray of light projected upwardly at an angle of 45° (line $a$) will not illuminate the cathode of Fig. 4, while such a ray will activate the full area of the cathode of Fig. 5. As the light angle changes progressively to the horizontal line $b$, the cathode of Fig. 4 will be illuminated in a progressively increasing area, while the shadow of the shield 15 creeps down the cathode of Fig. 5 and thus decreases the area of activation. If the phototube is to pick up light at a lesser angle than 45° to a vertical line, as when the craft is at a high altitude, then the shields and sensitive elements will be suitably arranged to satisfy the geometric requirements.

According to the modification shown in Figs. 6 and 8, I may employ an opaque plate in front of the phototube which has a small window or opening therein arranged to provide a straight edge which cuts the light ray as required and forms a straight shadow and light image on a flat plate cathode. Various constructions may be employed for the purpose, such as a rectangular box container 16 (Fig. 1) for the phototube which is provided with the window in proper location. As illustrated, the casing wall 17 or 18 may provide a straight edge 19 that casts a shadow on the cathode. This edge is likewise located in a plane perpendicular to a horizontal line passing through the center of the cathode surface so that the light at a 45° angle (line $a$) will be prevented by the lower wall 17 (Fig. 6) from activating the cathode, while the upper wall 18 (Fig. 8) will permit full activation of the cathode of a second tube. The distance of the wall and the size of the cathode are related, as illustrated, so that the cathode will be fully illuminated by the 45° light ray where the upper shield 18 is used, and the cathode will be fully activated by a horizontal light ray $b$ where the shield 17 is located beneath the center plane normal to the cathode. The shield 17 or 18 may also be located within the phototube, as shown by the part 17a in Fig. 9, so as to avoid errors of refraction and reflection; but if needed, the glass tube may be coated with a non-reflective film.

This phototube construction and principle of operation may be employed in making various indications and for controlling numerous types of apparatus, such as for determining the position and altitude of aircraft. Referring now to Fig. 1, a pair of phototubes 20 and 21 corresponding with the constructions of Figs. 2 to 6, are mounted near each end of the wing 22 of the aircraft 23 in suitable protective casings 16 and in such positions that they may be activated by light beneath the aircraft and closely positioned relative thereto, such as when the craft has nearly reached the ground. The runway of the airport is provided with a light line extending preferably along its center line and the effective distance of runway approach, as by a light extension of a mile or so beyond. Similarly, the line of light may be formed of any suitable construction, such as a series of electric light bulbs spaced apart by 10 or more feet, or any other type of continuous line of illumination may be provided for the purpose. The light line may be arranged beneath a horizontal shield of transparent material which will transmit infrared rays. The light bulbs may be of 50 candle power or higher, or of such an intensity that the light may be readily perceived by the photoelectric elements under the densest of cloud and storm conditions when the aircraft is from 200 to a thousand feet above the runway lights. Also, if desired, the light may be modulated as by means of a light chopping device so as to give a frequency of modulation which is quite different from that of any other light at the airport; and the electronic apparatus will be provided with a suitable band pass filter system so that it may be tuned only to the frequency of the modulated light. That is, a band pass filter may be employed in the phototube bridge circuit so as to pass only a pulsating direct current having a frequency within a narrow band including that of the modulated light, such as 500 to 700 cycles per second for a modulated light of 600 cycles. Such high and low pass filters and modulated light constructions are well known and need not be herein described.

Although a single shielded tube has various uses, I prefer to employ a pair of balanced tubes as herein explained, and especially for determining the altitude or position of an aircraft above a ground light, or for determining the relative position of one aircraft to another in flight formation, where each carries both the electronic apparatus and a beacon light. To that end, two phototubes having equal or related cathode areas are connected in a balanced bridge circuit. As illustrated, each pair of phototubes is mounted in a widely spaced relationship laterally of the craft, such as on the wing tips and at a suitable angle relative to a vertical line so that the illumination of the tubes varies progressively as the aircraft comes to the ground from a considerable distance above the runway. The photo elements are preferably tilted at 22½° relative to a vertical line, as shown in Figs. 4 to 6, so as to observe both horizontal light and a beam that is at 45° to the horizontal. If the distance between the two pieces of photoelectric apparatus on the wing tips is 200 feet, for example, then the aircraft would be 100 feet above the ground when a light beam from the source 24 makes an angle at each phototube of 45° relative to a horizontal line, as indicated by the line $a$ in the figures. In that position the phototube 21 (Fig. 5) has its cathode fully illuminated and the other tube 20 (Fig. 4) is not activated. When the craft is at a higher altitude the same condition prevails, except as light (lines c, Fig. 1) may be cut off by the tube base or other obstruction. As the craft descends, the angularity of the light ray changes, and the area of illumination of the cathode of tube 21 decreases to zero while the illumination of the cathode of tube 20 increases to its maximum. Hence the two tubes are reversely affected by the change in directive angularity of the light. The differential between the light activation of the two spaced light sensitive elements may therefore be employed to indicate the position of the craft and to triangulate the angularity of the light beams as a measurement of altitude. If the aircraft is not centered over the runway lights, then the angles of the two beams striking the corresponding tubes on the two wing tips will be different; whereas if the aircraft is thus aligned, then these angles will be equal and the altitude triangulation may be effected.

To provide the required triangulation, I may connect each pair of tubes 20 and 21 in separate electronic circuits, and employ the combination effect on a suitably calibrated instrument to give the required measurements. In the preferred arrangement, each pair of photocells is mounted in a light shielding casing 16 which cuts out extraneous light to the maximum extent but has a window providing for the transmission of the light from the runway. Such constructional details may be suitably made in accordance with the requirements of the aircraft construction. The preferred electronic circuits are illustrated in Fig. 7, in which each circuit has its two tubes mounted in series with a battery or other source of power 25 so that each forms a load for the other. A contact 26 grounded to the aircraft framework varies the resistance of a potentiometer 27 which is connected between the anode of tube 20 and the cathode of tube 21, as illustrated. This bridge circuit is balanced by varying the position of the contract arm 26 when the two photo tubes are exposed to the same light conditions. This serves to govern the potential of the grid 30 of a pentode amplifier tube 31. That is, the cathode of tube 20 and the anode of tube 21 are connected together and a common terminal leads to the grid. The cathode 32 of the amplifier is heated by a supplemental D. C. or A. C. heating circuit 33, as is understood. The cathode 32 is grounded and further connected to a screen grid 34 arranged between the cathode and the anode 35. A further suppressor grid 36 is placed between the other two grids and connected through a variable contact with a battery 40 whose negative terminal is grounded and which has the variable contact arm 41 connected with the amplifier to supply the necessary current thereto.

The left hand amplifier circuit governs the needle 44 of a suitable milliammeter or galvanometer indicated diagrammatically at 46. Similarly, the right hand circuit of Fig. 7 controls the needle 45 of another galvanometer. These two galvanometers are so constructed and calibrated relative to the electronic circuits that the position of each needle gives an indication of the position and altitude of the aircraft. If the craft is travelling towards the runway but at the left of its center line, then the needles 44 and 45 will cross in the upper left hand quadrant 47 of the instrument face and thus indicate to the pilot that he should swing over towards the right. When this has been accomplished to the proper extent, then the two needles will cross on the vertical scale line 48 and the point of intersection of the two pointers gives a reading of altitude above the runway. Thus the pilot has merely to watch the needles and to govern his flight motion accordingly, and without seeing the ground he can bring the aircraft safely to a blind landing. Although the runway is entirely obscured by fog, rain or snow, the infrared rays from the light source will penetrate the atmospheric conditions and activate the photocells and particularly at the comparatively low altitudes at which this landing system is required. The craft may come in on the standard radio beam which is adequate only at the higher altitudes, but the pilot will watch the indicator of my apparatus when he approaches the runway so as to ascertain his lateral position as well as altitude.

Various types of photo emissive tubes may be employed. A preferred construction is one in which the cathode has a sensitive surface coating of a suitable metal, such as caesium on caesium oxide applied to a base of silver. The phototube may be a General Electric argon gas filled PJ23 tube which is sensitive to wave lengths between about 3,000 and 12,000 Angstrom units and is particularly sensitive to infrared light.

I may also use a photo voltaic cell such as a copper oxide cell or a "Weston" photo voltaic cell. I may also employ a resistance cell of the selenium type. I particularly prefer to employ a "Thalofide" cell having a platinum disk provided with a sensitive surface of thallium metal treated with oxygen and sulfur to make it sensitive to light. The photosensitive resistance type of cell is extremely sensitive to light at about 10,000 Angstrom units and so is particularly useful for activation by infrared light. Also, molybdenum sulfide is very sensitive to infrared of the longer wave lengths and can be used up to about 20,000 Angstrom units. Each of these types of cell has the light shield so arranged, and the sensitive surface of such shape and location that a light beam moving through a given angle may activate varying areas of the light sensitive elements as the light angularity changes.

I may use various filtering materials for the light shield of the photosensitive element, which are selectively transluscent to light waves, such as a filter which absorbs or does not permit the passage of the long wave lengths. For example, I may use Wratten gelatin filters Nos. 64, 65 and 67 which transmit light other than red and infrared. I may also employ cellulose nitrate or cellulose acetate as a film on the outside of a transparent plate or the glass envelope of the photosensitive element. Such films are opaque to red and infrared light but transluscent to other light waves. I may control the transluscence by adding opaque powders or dyes. For example, I may add a small amount of dispersed graphite to a nitro-cellulose solution for spreading as a film on the outside of the glass shell or wall. This graphite has the property of preventing the passage of infrared light. In such constructions, it is immaterial as to what other light waves pass through the filter shield to the light activated surfaces, since the balanced tubes are affected equally and the differentiation therebetween depends solely upon the amount of infrared light that is received. I may also have the shield made of an entirely opaque material so as to shut off all light waves from the shadowed portion of the sensitive element. Since infrared rays travel in straight lines and there is but little or no ambinet infrared light in the air, I prefer to employ those long waves for the control of my indicating instrument, and especially for indicating the altitude or position of craft in a fog, such as a boat at sea or an aircraft flying under zero ceiling conditions. Instead of coating the glass of a phototube directly, I may make a cap or band of suitable filter material and slip the same into position on the tube, provided, however, this band is located accurately relative to the cathode so as to give the desired control of cathode illumination in accordance with the angular direction of the light beam. However, to make calibration easy, I prefer to use the straight edge of a wall in co-operation with a flat photosensitive element, so that the light shadow has a straight edge.

In a simplified apparatus, two single photocells may be employed in the required spaced relationship laterally of the craft, such as on the wing tips, with each so positioned relative to a light shield that the area of activation of the one photosensitive element is varied in accordance with the directive angularity of the light beam. Also, I may use a single measuring device having but a single needle for various purposes, such as to give the desired indication of position or altitude relative to the runway lights. However, the balanced circuit above described is more satisfactory in that it gives a very sensitive control of the indicator. The phototubes, which are preferably of the vacuum type, are operated according to standard practice to take advantage of the weakest light condition, and the current voltage characteristics are such that the circuit is very sensitive and the difference in light reception of the two cathodes gives a large change in grid potential for the amplifier tube. Any variation in light intensity, as may be caused by fog, cloud, rain or snow, is immaterial. In this arrangement, if one tube receives more light than the other, its resistance decreases and the voltage distribution between the two tubes changes and thus varies the grid potential of the amplifier tube.

Many other modifications may be made in the circuits and indicating apparatus. Also, I may employ various constructional features set forth in my prior applications in accordance with the principles here described, such as by mounting the photoelectric apparatus of either of said prior cases on the wing tips in widely spaced lateral arrangement for observing the single light row beneath the aircraft, and by connecting the two separate pieces of photo apparatus in a suitable circuit with a calibrated indicator to give the desired position indication.

Although I have illustrated herein a specific type of photosensitive element, it is to be noted that in the broader aspects of my invention, I may employ the various types of apparatus set forth in the above-mentioned applications subject to suitable modifications in the circuits and calibration of the instruments. That is, I employ the single central line of light aligned with the runway center line, and I mount similar photoelectric apparatus on the tip of each aircraft wing in such positions that they may observe simultaneously the light beneath the craft during a landing approach; and the indicating instruments separately controlled by the two spaced photo apparatus are arranged to provide the cross pointer construction shown in Fig. 7 so that the directional angularity of the light beam relative to each photo element is indicated thereby.

It is to be understood that the above disclosure is intended to set forth the principles of my invention and preferred embodiments and not to impose limitations on the appended claims.

I claim:

1. Apparatus for aiding the landing of aircraft on a runway comprising a single horizontal line of light extending in the direction of the runway and throughout the effective distance of landing approach, electronic apparatus comprising a pair of photosensitive elements mounted on the craft in widely spaced positions laterally of the craft where both may simultaneously observe the light as the craft flies thereover for a landing, means including a shield which limits the activation of each element to substantially unidirectional rays from said light, each element and shield providing a progressive predetermined variation in the area of activation of the element as the directive angularity of the light changes within a given vertical angle above a horizontal plane, an electric circuit connected to and governed by each element in response to the variation in area of activation, and electrical apparatus governed by the circuit of each element which translates the directive angularity of the light received by both elements as an indication of the craft altitude and alignment relative to the line of light.

2. Apparatus for aiding the landing of aircraft on a runway comprising a single horizontal line of light extending in the direction of the runway and throughout the effective distance of landing approach, two photosensitive elements mounted on and in widely spaced positions laterally of the craft, means for supporting the elements where both may simultaneously observe the light while the craft descends to the runway, an electronic circuit including an amplifier connected to and governed by each element, means including a shield associated with each element which limits the activation of each element to substantially unidirectional rays from the light and causes a predetermined variation in activation of the element in a definite relation to the directive angularity of the light incident to each element, and electrical indicating apparatus governed by the amplifier in the circuit of each element which translates the directive angles of the light rays to both elements as an indication of the craft altitude and alignment relative to the line of light.

3. Apparatus according to claim 2 in which the electrical indicating apparatus comprises pivoted pointers in a crossed arrangement and a central scale line calibrated in altitude, the movement of one pointer being governed by one photo-sensitive element and the movement of the other pointer by the other element, so that the craft position is indicated by the location of the intersection of the pointers and the altitude is determined only when the pointer intersection coincides with the scale line.

4. Apparatus for aiding the landing of aircraft on an airport runway comprising a single horizontal upwardly projecting line of light at the airport extending in the direction of the runway and throughout the effective distance of aircraft landing approach, electronic apparatus on the aircraft including a pair of photosensitive elements which are widely spaced laterally of the craft, an electric circuit connected to and governed by each element, means for supporting each element so that it may face towards and optically observe the light line while the craft is approaching in alignment with the runway and during the landing thereof, means including a shield associated with each element which limits the activation thereof to substantially unidirectional rays from said light and causes a predetermined variation in an electrical characteristic in the circuit governed by each observing element in response to a variation in the directive angularity of the light within a predetermined vertical angle above a horizontal plane and electrical apparatus governed by a variation in said characteristic in the circuit of each element which translates the directive angularity of the light relative to the elements as an indication of craft position relative to the line of light.

5. An apparatus for aiding the landing of aircraft on a runway comprising a horizontal line of light extending in the direction of the runway and throughout the effective distance of aircraft approach, electronic apparatus including two light sensitive elements mounted on the craft in widely spaced locations near the two wing tips which face toward and are arranged to be activated by said light as the directive angularity thereof changes while the craft descends to land on the runway, a shield providing a shadow casting edge located in front of and spaced from the medial portion of each element where it shadows a progressively varying area of the element and causes the area of activation by said light to vary between a minimum and substantially the maximum area as the direction of the light varies within a definite vertical angle above a horizontal plane, said apparatus including separate electrical circuits for the two elements, each circuit responding to said variation in area of activation of the associated element, and two electrical indicators governed independently by the two circuits which cooperate in progressively interpreting the light directions to the two elements in terms of the craft position.

6. An apparatus for aiding the landing of aircraft on a runway comprising a single horizontal line of light extending in the direction of the runway and throughout the effective distance of landing approach, two pairs of closely spaced photo sensitive elements of similar characteristics, means for mounting a pair of elements on the craft near each wing tip and so that they face towards and simultaneously observe the line of light for a progressive activation thereby as the directive angularity of the light changes while the craft descends in alignment with the runway and lands thereon, light shields in front of the elements having shadow casting edges, said shields and elements being arranged relative to the light direction so that one element of each pair is substantially fully activated and the activation of the other is at a minimum when the light comes from one limiting direction and the activation of each element of the pair is progressively varied, one increasing and the other decreasing, as the craft descends and the directive angularity of the light changes, electrical indicating apparatus including an amplifier in circuit with and governed by the simultaneous differential activation of the two elements of each pair, each indicating apparatus having an indicator so arranged that the two indicators progressively interpret the directions of the light to the associated pairs of elements as the craft altitude.

7. Photoelectric apparatus comprising a pair of photocells having light sensitive elements of related areas, means for mounting the cells so that they face in the same direction for activation by a light that moves relatively through a given angle, a light shield in front of each element having an edge which is so located that light of a given directive angularity activates the major effective area of one element and the minimum area of the other element, and each shield shadows a varying area of the element as the angularity of the light changes relative to the shield edge, the shields being on opposite sides of the center lines of the elements so that the one shadow moves progressively to decrease the illumination of its associated element as the other shadow moves to increase the illumination, and electronic apparatus governed by a variation in activation of the two elements in a predetermined relation to the angle of the incident light.

8. Apparatus according to claim 7 in which each shield comprises a material of controlled density adjacent to the edge which is partly translucent to selected light wave lengths and substantially opaque to the remaining light waves.

9. Photoelectric apparatus comprising two photocells of similar characteristics having flat light activated elements of equal areas, means for mounting the cells so that they face towards a light for activation while the light moves relatively through a given angle, light shields close to and in front of the elements and located on opposite sides of medial points thereof which have shadow casting straight edges arranged to vary the included angle of illumination and cause a decreasing activation of one element and an increasing activation of the other within the limits of substantially zero and maximum areas as the angularity of the light varies relative to said edges and the associated elements, means providing a balanced electric circuit for the two photocells, an amplifier tube having its grid potential varied by an unbalance in said circuit as caused by the differential activation, and electrical apparatus governed by the amplifier tube in a predetermined relation to the angularity of the light.

10. Photoelectric apparatus comprising two photocells having similar characteristics and light sensitive elements of related areas, means for mounting the cells so that they face towards a light for activation while the light moves relatively through a given angle, a light filtering shield that is translucent to short wave lengths of light but opaque to the infared light arranged in front of but to one side of the medial portion of each sensitive element, one shield providing a shadow casting edge that causes an increase in the included angle of illumination of its associated element and the other shield having a shadow casting edge that causes a decrease in the included angle of illumination of the other element as the light changes in directive angularity relative to each edge, an electric circuit having said elements arranged in a balanced condition for a given angularity of the light and which becomes unbalanced as the angularity changes, and electrical apparatus governed progressively by said circuit in a predetermined relation to a change in angularity of the light rays relative to the two sensitive elements.

11. Photoelectric distance measuring apparatus comprising a source of light, electronic apparatus movable through a given angle relative to the light having photocells provided with light sensitive elements of related areas, means for supporting the cells so that they face in the same direction for activation by the light as the directive angularity changes through said angle, shields opaque to infared light having shadowing edges arranged in front of and close to but at opposite sides of the medial portion of each element which provide edges for casting shadows and varying the included angle of illumination and the area of light activation of the associated elements within the limits of substantially zero and maximum areas as the angularity of the light changes relative to each edge, the shields throwing shadows in opposite directions so that the activation of one element increases while the other decreases, means providing a balanced electrical circuit for said photocells which becomes increasingly unbalanced with a variation of area of light activation, and indicating apparatus calibrated in terms of distance related to the directive angle of said light source which is governed by said balanced circuit.

ROBERT J. HERBOLD.

REFERENCES CITED

The following references are of record in the file of this patent:

UNITED STATES PATENTS

| Number | Name | Date |
| --- | --- | --- |
| 755,840 | Bose | Mar. 29, 1904 |
| 791,785 | Hertzberg et al. | June 6, 1905 |
| 1,815,073 | Rentschler et al. | July 21, 1931 |
| 1,988,505 | Morandini et al. | Jan. 22, 1935 |
| 2,070,178 | Pottenger et al. | Feb. 9, 1937 |
| 2,206,036 | Herson | July 2, 1940 |
| 2,216,716 | Withem | Oct. 1, 1940 |
| 2,297,534 | Brulin | Sept. 29, 1942 |
| 2,366,939 | Smith et al. | Jan. 9, 1945 |
| 2,415,178 | Hurley | Feb. 4, 1947 |
| 2,444,442 | Herbold | July 6, 1948 |